(12) United States Patent
Niemenmaa et al.

(10) Patent No.: US 8,620,352 B2
(45) Date of Patent: Dec. 31, 2013

(54) PRIVACY OF LOCATION INFORMATION

(75) Inventors: Jarko Tapio Henrik Niemenmaa, Espoo (FI); Ville Matti Harri Ruutu, Espoo (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 13/263,348

(22) PCT Filed: Apr. 8, 2009

(86) PCT No.: PCT/EP2009/054176
§ 371 (c)(1),
(2), (4) Date: Nov. 23, 2011

(87) PCT Pub. No.: WO2010/115457
PCT Pub. Date: Oct. 14, 2010

(65) Prior Publication Data
US 2012/0058784 A1 Mar. 8, 2012

(51) Int. Cl.
*H04W 24/00* (2009.01)
(52) U.S. Cl.
USPC ........................................... 455/456.2

(58) Field of Classification Search
USPC .............................................. 455/456.2, 411
See application file for complete search history.

(56) References Cited

U.S. PATENT DOCUMENTS

| | | | |
|---|---|---|---|
| 2005/0014485 A1 | 1/2005 | Kokkonen et al. | |
| 2005/0227685 A1 | 10/2005 | Costa Requena et al. | |
| 2006/0135177 A1* | 6/2006 | Winterbottom et al. | 455/456.1 |
| 2007/0191023 A1* | 8/2007 | Walter | 455/456.2 |
| 2008/0176582 A1* | 7/2008 | Ghai et al. | 455/456.2 |

OTHER PUBLICATIONS

International Search Report and Written Opinion Corresponding to International Application No. PCT/EP2009/054176 dated Mar. 2, 2010.

* cited by examiner

*Primary Examiner* — Temica M Beamer
*Assistant Examiner* — Joel Ajayi
(74) *Attorney, Agent, or Firm* — Squire Sanders (US) LLP

(57) ABSTRACT

An arrangement for providing privacy settings for determining whether location information for a subscriber can be provided to a requesting party is described. The privacy settings are at least partially based on presence information for the subscriber. A gateway mobile location center (GMLC) selectively provides the location information regarding subscribers on request, in accordance with the privacy settings.

12 Claims, 3 Drawing Sheets

PRIVACY OF LOCATION INFORMATION

The invention is related to the provision of location information regarding a user, such as the user of a mobile communication device, to a third party. In particular, the invention is related to the privacy of such location information.

It is recognised in the art that privacy is important to the provision of location based service (LBS) solutions for cellular networks. For example, 3GPP LoCation Services (LCS) and Open Mobile Alliance (OMA) Secure User Plane Location (SUPL) standards include mechanisms to enable subscribers to control, to some degree, who can locate them.

FIG. 1 is a block diagram of a system, indicated generally by the reference numeral 2, demonstrating the protection of user privacy in an LBS system. The system 2 comprises a location based service (LBS) client 4 and a Gateway Mobile Location Centre (GMLC) 6. The GMLC 6 includes a privacy manager (PM) 8.

The GMLC 6 enables the LBS client 4 to request information regarding the location of a defined subscriber. For example, the GMLC 6 may support the 3GPP Gateway Mobile Location Centre (GMLC) and OMA SUPL Location Platform (SLP) functionalities.

The privacy manager 8 enables subscribers to control their privacy settings. Thus, the privacy manager 8 ensures that location information is only disclosed to the LBS client 4 in accordance with rules specified by the subscriber. By way of example, the privacy manager 8 may contain a privacy profile set by a subscriber having some of the following features:

Subscribers may define services that are allowed to access their location information.
Subscribers may define services that are not allowed to access their location information.
Subscribers may limit exposing their location information to a group of named people.
Subscribers may limit when and/or where they allow themselves to be located.

By way of example, a subscriber may specify in his privacy settings that any individual listed as being his friend can locate him at the weekend (but not between Monday and Friday), but only if the subscriber is located in Helsinki.

Although currently available systems enable a user to set a privacy profile, the profile is typically static. Any changes to the profile need to be set by a user; this is time-consuming and inconvenient for the user.

The present invention seeks to address at least some of the problems outlined above.

The present invention provides a method comprising receiving a request for location data concerning a first user and determining whether or not to provide location data in response to said request, wherein the determination of whether or not to provide said location data is at least partially based on presence information for the first user.

The present invention also provides an apparatus (such as a gateway mobile location centre, or a privacy manager of a gateway mobile location centre) comprising a first input for receiving a request for location data for a first user and a processing means for determining whether or not to provide the requested location data in response to said request, wherein the processing means is adapted to respond to the request based, at least in part, on presence information for the first user. The apparatus may further comprise a second input for receiving said presence information for the first user. The apparatus may further comprise a third input for receiving location data regarding the first user.

The present invention also provides an apparatus (such as a gateway mobile location centre, or a privacy manager of a gateway mobile location centre) comprising a first input for receiving a request for location data for a first user and a controller for determining whether or not to provide the requested location data in response to said request, wherein the controller is adapted to respond to the request based, at least in part, on presence information for the first user. The apparatus may further comprise a second input for receiving said presence information for the first user. The apparatus may further comprise a third input for receiving location data regarding the first user.

Thus, the invention enables presence information to be taken into consideration when deciding whether or not location data for a subscriber should be provided to a requesting party. By way of example, the presence status of a user may include one or more of the reachability of the user, the willingness of the user to communicate and the current communication capabilities of the user. Of course, other presence information may be provided in addition to, or instead of, the examples provided above.

The invention may also include obtaining said presence information, for example using session initiation protocol (SIP) messages. In one form of the invention, SIP SUBSCRIBE and NOTIFY messages are exchanged such that the processing means (or the controller) can be informed of any changes in the presence status of the first user (or any other user).

In some forms of the invention, the presence information is received from a presence enabler.

In addition to the presence status of the first user, many other factors may be taken into account. By way of example, one or more of the following may be taken into account when determining whether or not to provide said location data: the location of the first user, the identity of the requesting party and the current time. Another factor that may be taken into account is the type of requesting party; for example, in some situations, an application that belongs to the category of "roadside assistance" may be allowed to receive location data concerning the first user.

In some forms of the invention, the request may be received from a location based service client.

The request may be a mobile location protocol (MLP) request.

The determination of whether or not to provide said location data may be carried out by a gateway mobile location centre. The determination of whether or not to provide said location data may be carried out by a privacy manager. The determination of whether or not to provide said location data may be carried out by a gateway mobile location centre in conjunction with a privacy manager. The privacy manager may form part of the gateway mobile location centre, or may be a separate component that is in communication with the gateway mobile location centre.

The present invention further provides a system comprising an apparatus as set out above and further comprising a location based services client and/or a presence enabler.

The present invention yet further provides a computer program product comprising: means for receiving a request for location data concerning a first user; and means for determining whether or not to provide location data in response to said request, wherein the determination of whether or not to provide said location data is at least partially based on presence information for the first user.

The present invention also provides a computer program comprising code for receiving a request for location data concerning a first user; and code for determining whether or not to provide location data in response to said request, wherein the determination of whether or not to provide said location data is at least partially based on presence information for the first user. The computer program may be a computer program product comprising a computer-readable medium bearing computer program code embodied therein for use with a computer.

Exemplary embodiments of the invention are described below, by way of example only, with reference to the following numbered drawings.

The present invention makes use of presence information for location information privacy control.

Presence information refers to dynamic information concerning a subscriber, and typically refers to the availability and/or willingness of the subscriber to communicate with others. Presentity refers to an entity that has presence information associated with it. Presence information includes, for example, status, reachability, willingness to communicate and capabilities of that presentity. Although a presentity is often a subscriber, it can also, for example, be a role such as a help desk.

The use of presence information for location information privacy control enables presence information (which is often already available) to create dynamic and flexible privacy settings. Presence status can be taken into consideration when it is decided whether or not location information is to be disclosed to a location based service (LBS) client.

By way of example, a subscriber may define that he/she can be located only when all of the conditions are met:

1. It is a weekday (i.e. Monday to Friday).
2. The time is between 8 am and 4 pm.
3. The subscriber's presence state is "in meeting".

Figure 2:
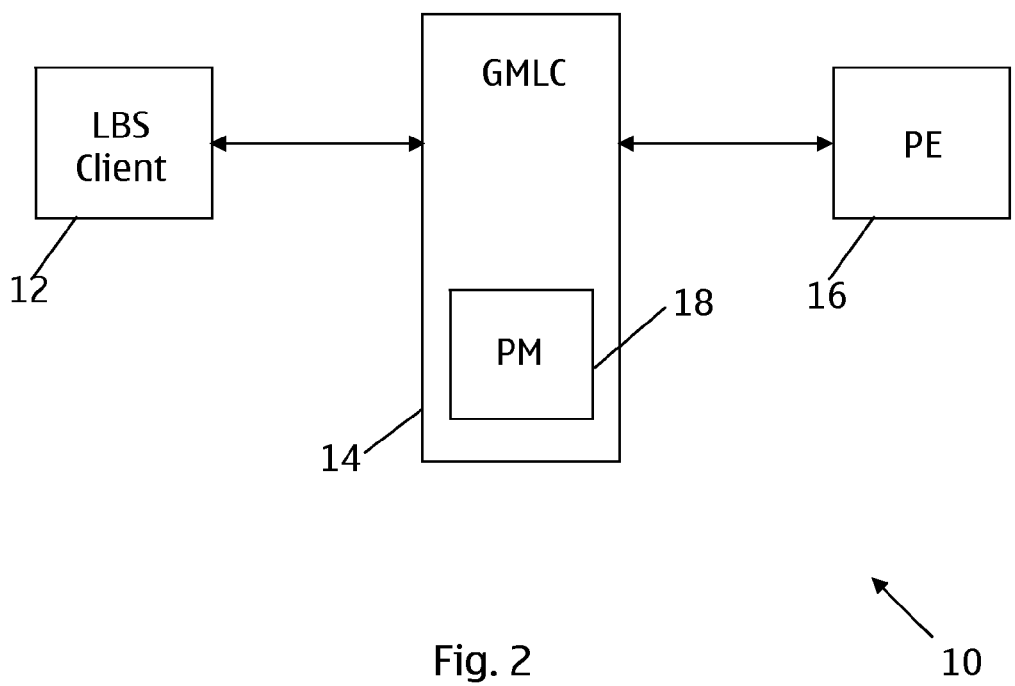
FIG. 2 is a block diagram of a system in accordance with an aspect of the invention.

FIG. 2 is a block diagram of a system, indicated generally by the reference numeral 10, that enables presence information to be used for location information privacy control.

Figure 1:
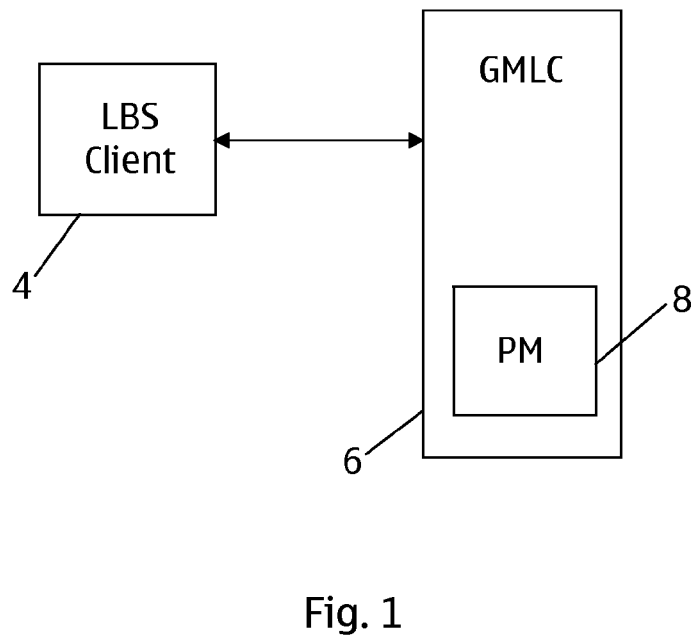
FIG. 1 is a block diagram of a system demonstrating the protection of user privacy in an LBS system.
Figure 3:
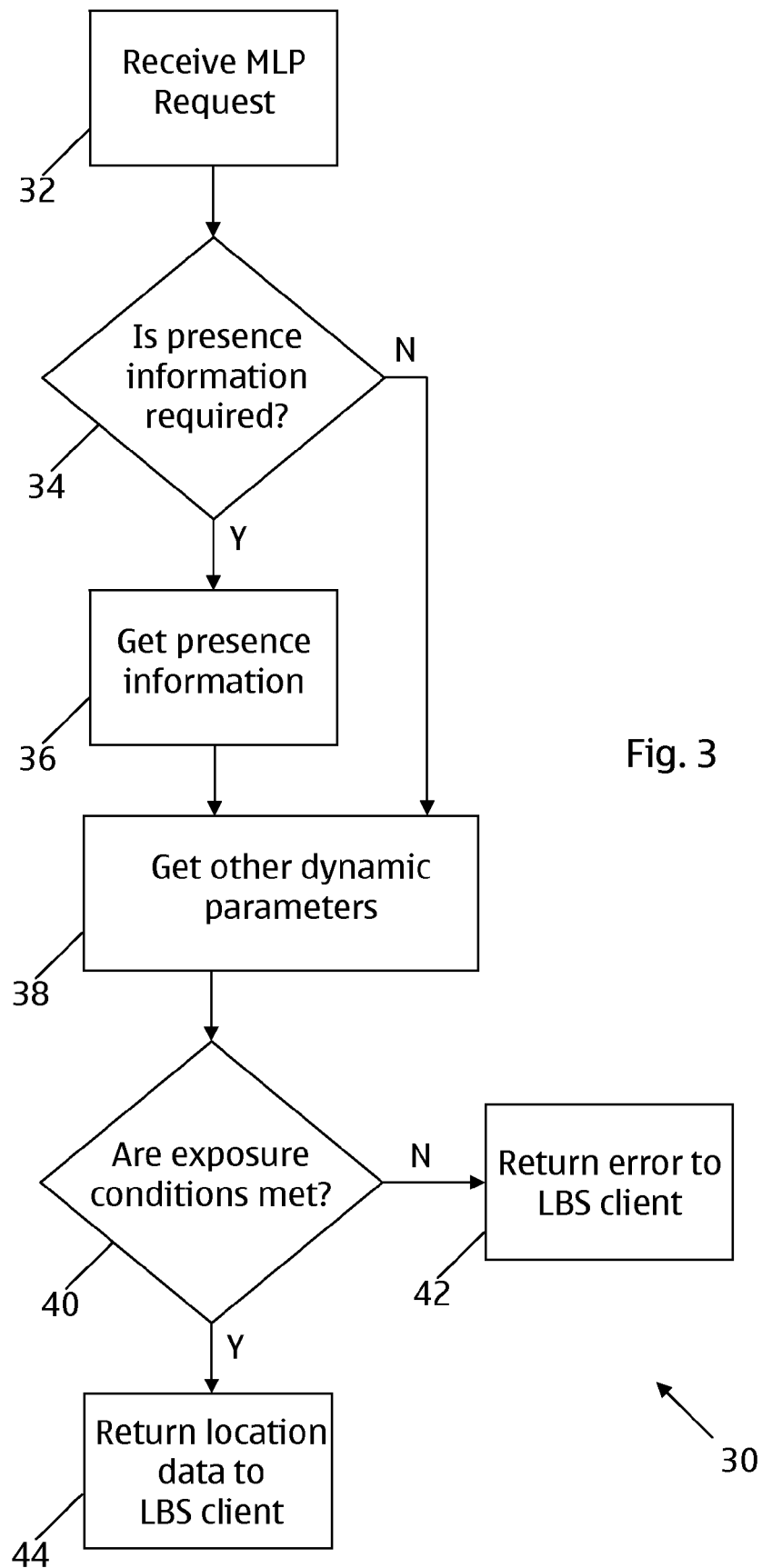
FIG. 3 is a flow chart demonstrating an aspect of the invention.

The system 10 comprises a location based services (LBS) client 12, a Gateway Mobile Location Centre (GMLC) 14, and a presence enabler 16. The GMLC 14 comprises a privacy manager 18. The privacy manager 18 is shown in FIG. 3 as being part of the GMLC 14 but could also be provided as a separate module that is in communication with the GMLC. The LBS client 12, GMLC 14 and privacy manager 18 are similar to the LBS client 4, GMLC 6 and privacy manager 8 described above with reference to FIG. 1.

The presence enabler 16 is in communication with one or more subscribers (not shown) and stores presence information for one or more subscribers. This presence information is used by the privacy manager to control access to location information, as discussed further below.

It should be noted that the elements of the system 10 are all known. The present invention lies in the combination of those elements and the way in which those elements are used, as discussed further below.

FIG. 3 is a flow chart, indicated generally by the reference numeral 30, showing an exemplary algorithm in accordance with the present invention.

The algorithm 30 starts at step 32, where the GMLC 14 receives a mobile location protocol (MLP) request from the LBS client 12 for location information regarding a particular subscriber. MLP is a protocol specified by the Open Mobile Alliance (OMA) for obtaining the position of mobile devices (such as mobile communication devices). Of course, MLP is one of a variety of protocols that could be used to request and provide location data. Although the invention is described with reference to the MLP protocol, the invention is not so limited.

An exemplary MLP Request (a so-called Standard Location Immediate Request (SLIR)) is given below.

```
<slir ver="3.3.0" res_type="SYNC">
    <msids>
        <msid type="IPV4">93.10.0.250</msid>
        <msid_range>
            <start_msid>
                <msid>461018765710</msid>
            </start_msid>
            <stop_msid>
                <msid>461018765712</msid>
            </stop_msid>
        </msid_range>
        <msid type="ASID">441728922342</msid>
        <msid_range>
            <start_msid>
                <msid>461018765720</msid>
            </start_msid>
            <stop_msid>
                <msid>461018765728</msid>
            </stop_msid>
        </msid_range>
    </msids>
    <eqop>
        <resp_req type="LOW_DELAY" />
        <hor_acc>1000</hor_acc>
    </eqop>
    <geo_info>
        <CoordinateReferenceSystem>
            <Identifier>
                <code>4004</code>
                <codeSpace>EPSG</codeSpace>
                <edition>6.1</edition>
            </Identifier>
        </CoordinateReferenceSystem>
    </geo_info>
    <loc_type type="CURRENT_OR_LAST" />
    <prio type="HIGH" />
</slir>
```

In response to the MLP request 32, the GMLC 14 determines (in step 34) whether presence information for the subscriber concerned is required. The step 34 may include the GMLC 14 asking the presence enabler 16 whether the presence enabler already has the required presence data for the subscriber concerned, as discussed further below.

If presence data is required, the algorithm 30 moves to step 36, where the presence enabler 16 requests the required presence data from the subscriber. Once the presence data has been obtained, the algorithm moves to step 38.

If, at step 34, presence data is deemed not to be required, the algorithm 30 moves from step 34 directly to step 38.

At step 38, the GMLC obtains any other parameters that may be relevant to determining whether the conditions required to expose a subscriber's location information are met. By way of example, the other parameters may include the time of day or the day of the week. Of course, if no such conditions exist, then the step 38 could be omitted.

From step 38, the algorithm moves to step 40, where the privacy manager 18 (or, in some embodiments, the GMLC 14) determines whether the conditions required in order to expose the subscriber's location information are met. If the conditions are not met, then the algorithm 30 terminates at step 42, at which step an error message is returned to the LBS client 12, indicating that location information cannot be provided. If the conditions are met, then the algorithm 30 terminates at step 44, at which step the location information is returned to the LBS client 12.

An exemplary MLP location response (a so-called Standard Location Immediate Answer (SLIA)) is given below. The response provides several examples, the first of which provide the requested location data (thereby implementing step 44 of the algorithm 30) the last of which returns a "not attainable" response (thereby implementing step 42 of the algorithm 30).

```
<slia ver="3.3.0" >
  <pos>
    <msid>461011334411</msid>
    <pd>
      <time utc_off="+0200">20020623134453</time>
      <shape>
        <CircularArea srsName="www.epsg.org#4326">
          <coord>
            <X>30 16 28.308N</X>
            <Y>45 15 33.444E</Y>
          </coord>
          <radius>240</radius>
        </CircularArea>
      </shape>
    </pd>
  </pos>
  <pos>
    <msid>461018765710</msid>
    <pd>
      <time utc_off="+0300">20020623134454</time>
      <shape>
        <CircularArea srsName="www.epsg.org#4326">
          <coord>
            <X>30 12 28.296N</X>
            <Y>86 56 33.864E</Y>
          </coord>
          <radius>570</radius>
        </CircularArea>
      </shape>
    </pd>
  </pos>
  <pos>
    <msid>461018765711</msid>
    <pd>
      <time utc_off="+0300">20020623110205</time>
      <shape>
        <CircularArea srsName="www.epsg.org#4326">
          <coord>
            <X>78 12 34.308N</X>
            <Y>76 22 2.82E</Y>
          </coord>
          <radius>15</radius>
        </CircularArea>
      </shape>
    </pd>
  </pos>
  <pos>
    <msid>461018765712</msid>
    <poserr>
      <result resid="10">QOP NOT ATTAINABLE</result>
      <time>20020623134454</time>
    </poserr>
  </pos>
</slia>
```

As discussed above, a subscriber may define that he/she can be located only when all of the following conditions are met:

1. It is a weekday (i.e. Monday to Friday).
2. The time is between 8 am and 4 pm.
3. The subscriber's presence state is "in meeting".

In the event that a third party requests location information for that subscriber, step 36 of the algorithm 30 determines whether or not the subscriber's presence state is "in meeting" and step 38 of the algorithm 30 determines the day of the week and the current time. Step 40 then uses the data obtained in steps 36 and 38 to determine whether or not to provide the requested data.

In some forms of the invention, presence information for subscribers may be carried out as a background process, so that it is not necessary to determine whether up-to-date presence information needs to be obtained. In such an arrangement, the steps 34 and 36 of the algorithm 30 can be omitted.

In some forms of the invention, the privacy manager 18 may obtain presence information from the presence enabler 16 using the well-known session initiation protocol (SIP). In particular, the subscribe/notify mechanism of SIP may be used. As discussed further below, if the SIP subscribe/notify mechanism is used, then steps 34 and 36 of the algorithm 30 can be omitted.

Figure 4:
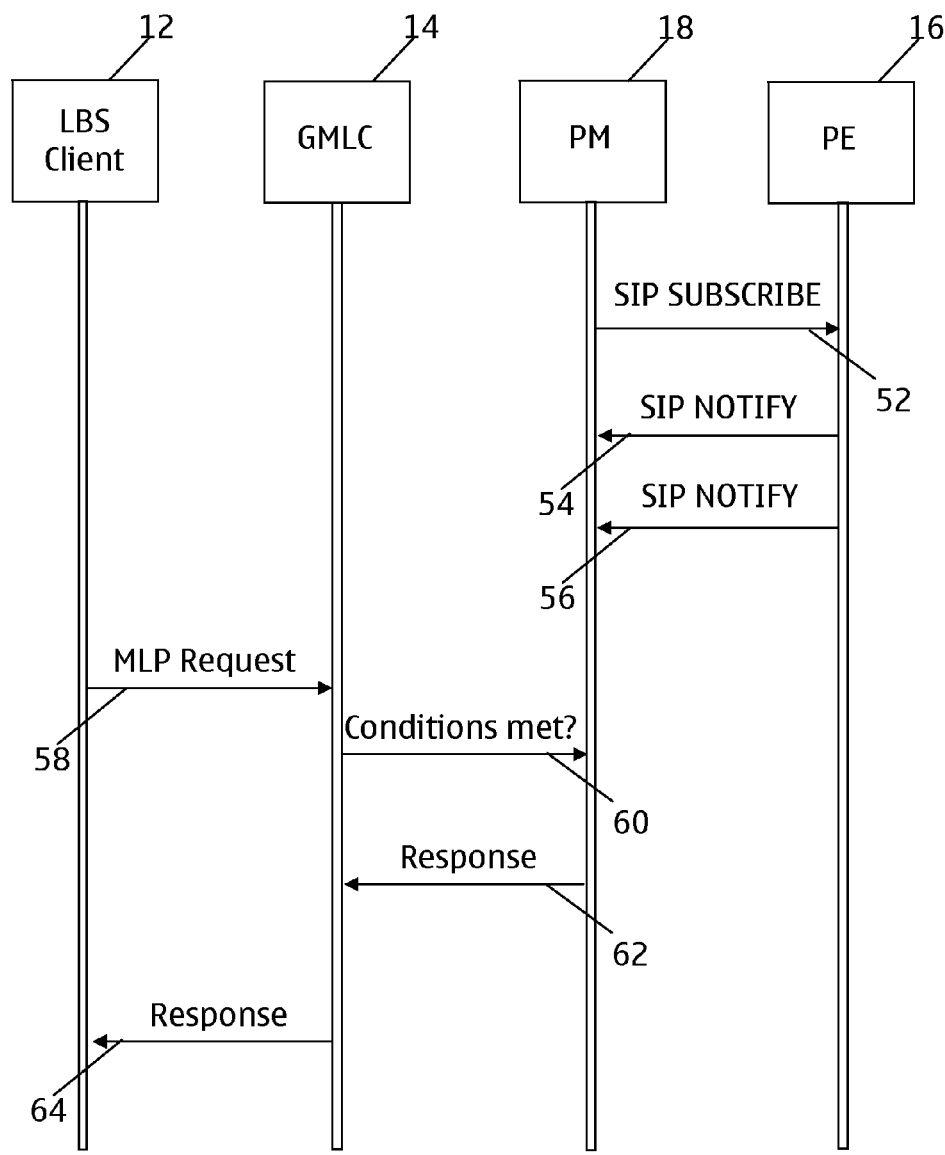
FIG. 4 shows a message sequence in accordance with an aspect of the invention.

FIG. 4 shows a message sequence, indicated generally by the reference numeral 50, showing the transfer of messages between the LBS client 12, GMLC 14, privacy manager (PM) 18 and presence enabler (PE) 16, in accordance with an exemplary embodiment of the present invention.

The message sequence 50 begins with the privacy manager 18 issuing a SIP SUBSCRIBE message 52 to the presence enabler 16. The message 52 instructs the presence enabler 16 to inform the privacy manager 18 each time the presence information for one or more specified subscribers changes. The presence enabler 16 is in communication with the relevant subscribers (not shown) in a manner well known in the art.

In response to the message 52, the presence enabler 16 sends a SIP NOTIFY message 54 to the privacy manager 18 providing the presence information for the specified subscriber(s).

A further SIP NOTIFY message 56 is sent from the presence enabler 16 to the privacy manager 18 each time the presence information for a specified subscriber changes. In the message sequence 50 two SIP NOTIFY messages are shown (the messages 54 and 56). Of course, in any particular implementation, the number of NOTIFY messages sent from the presence enabler 16 to the privacy manager 18 may vary greatly.

At some point, the LBS client issues an MLP request 58 to the GMLC 14 requesting location information for a particular subscriber. The MLP request 58 is, of course, similar to the request 32 described above with reference to FIG. 3.

In response to the request 58, the GMLC 14 sends a message 60 to the privacy manager 18 asking whether the condition(s) required for providing location information for that subscriber are met. The privacy manager determines the answer to this question on the basis of the presence information obtained from the SIP NOTIFY messages 54 and 56 and provides an answer in message 62 sent to the GMLC 14.

On receipt of the message 62, the GMLC provides a response 64 to the MLP request 58. The response 64 may provide the requested location information (as in step 44 of the algorithm 30) or may indicate that location information cannot be provided (as in step 42 of the algorithm 30).

In the message sequence 50, the steps 34 and 36 of the algorithm 30 described above with reference to FIG. 3 are omitted. This is because up-to-date presence information concerning the subscribers has been obtained by means of the SIP NOTIFY messages 54 and 56. Furthermore, step 38 may be omitted if no additional parameters are considered.

The embodiments of the invention described above are illustrative rather than restrictive. It will be apparent to those skilled in the art that the above devices and methods may incorporate a number of modifications without departing from the general scope of the invention. It is intended to include all such modifications within the scope of the invention insofar as they fall within the scope of the appended claims.

The invention claimed is:

1. A method comprising receiving a request for location data concerning a first user and determining whether or not to provide location data in response to said request, wherein the determination of whether or not to provide said location data is at least partially based on presence information for the first user, the presence information including at least one of reachability of the first user, willingness of the first user to communicate, and current communication capabilities of the first user, and wherein the determination of whether or not to provide said location data is carried out by a gateway mobile location centre.

2. A method as claimed in claim 1, further comprising obtaining said presence information.

3. A method as claimed in claim 2, wherein said presence information is obtained using session initiation protocol messages.

4. A method as claimed in claim 1, wherein the determination of whether or not to provide said location data includes consideration of the location of the first user.

5. A method as claimed in claim 1, wherein said request is received from a location based service client.

6. A method as claimed in claim 1, wherein said request is a mobile location protocol request.

7. An apparatus comprising a first input for receiving a request for location data for a first user and a processing unit for determining whether or not to provide the requested location data in response to said request, wherein the processing unit is configured to respond to the request based, at least in part, on presence information for said first user, the presence information including at least one of reachability of the first user, willingness of the first user to communicate, and current communication capabilities of the first user, and wherein said apparatus is a gateway mobile location centre.

8. An apparatus as claimed in claim 7, further comprising a second input for receiving said presence information for the first user.

9. An apparatus as claimed in claim 7, further comprising a third input for receiving location data regarding the first user.

10. An apparatus as claimed in claim 7, wherein said request for location data is received from a location based services client.

11. An apparatus as claimed in claim 7, wherein said presence information is received from a presence enabler.

12. A non-transitory computer readable medium having instructions stored thereon which, when executed by a processor, cause the processor to carry out a method, the method comprising:
    receiving a request for location data concerning a first user; and
    determining whether or not to provide location data in response to said request, wherein the determination of whether or not to provide said location data is at least partially based on presence information for the first user, the presence information including at least one of reachability of the first user, willingness of the first user to communicate, and current communication capabilities of the first user, and wherein the determination of whether or not to provide said location data is carried out by a gateway mobile location centre.

* * * * *